United States Patent [19]

Tlaker

[11] Patent Number: 4,542,638

[45] Date of Patent: Sep. 24, 1985

[54] AUTOMATIC CALIBRATION OF SENSOR CIRCUITS IN GEAR SHAPERS

[75] Inventor: Erich Tlaker, Springfield, Vt.

[73] Assignee: Fellows Corporation, N. Springfield, Vt.

[21] Appl. No.: 533,847

[22] Filed: Sep. 16, 1983

[51] Int. Cl.[4] ............................................. G01L 27/02
[52] U.S. Cl. ..................................... 73/1 R; 73/4 R; 364/571
[58] Field of Search .................. 73/1 R, 4 R; 364/571

[56] References Cited

U.S. PATENT DOCUMENTS 3,657,926  4/1972  Munson ................................. 73/4 R
3,689,748  9/1972  Bothne ................................. 73/4 R
3,740,533  6/1973  Van Zeggelaar ..................... 73/4 R
4,161,782  7/1979  McCracken ......................... 364/571

Primary Examiner—S. Clement Swisher
Attorney, Agent, or Firm—Arthur B. Moore

[57] ABSTRACT

A computer controlled apparatus for periodically calibrating the electrical outputs of pressure transducers to compensate for circuit-induced errors and produce accurate outputs in real time. Reference signals are periodically input into various circuit elements to determine resultant outputs. The relationship thus determined between these known inputs and corresponding outputs is used to correct the output of the circuit elements during operation.

9 Claims, 5 Drawing Figures

AUTOMATIC CALIBRATION OF SENSOR CIRCUITS IN GEAR SHAPERS

BACKGROUND OF THE INVENTION

1. Field of the Invention

The invention relates generally to automatic calibration circuits. More particularly the invention relates to a method and apparatus for automatically calibrating the output of a plurality of pressure transducers used in a hydromechanical gear shaping machine.

2. Description of the Prior Art

Hydraulic pressure transducers are used in hydromechanical gear shaping machines such as shown in U.S. Pat. Nos. 4,125,056, 4,136,302 and 4,254,690. Each of these patents has been assigned to the assignee of the present invention and is incorporated by reference herein. These pressure transducers generate analog electrical signals which are proportional to their associated hydraulic pressure levels. Proper operation of the hydromechanical gear shaper is highly dependent upon the proper operation of these transducers and the precise measurement of the load pressure and supply pressure.

It has been found that the pressure transducers used in prior art hydromechanical gear shaping machines have, after repeated operation tended to drift so that the electrical outputs of the sensors and their associated circuit components drifted as a result of amplifier gain or voltage offset changes. Such deviations are obviously detrimental to the proper operation of the machine and necessitate recalibration or replacement of the error producing components. Additionally, the inaccuracies of the sensor output may lead to operating inefficiencies if the signals indicate that greater power is required then is actually necessary for the proper performance of the gear shaper.

Accordingly, it is an object of this invention to overcome the disadvantages associated with these prior art pressure transducers by providing an automatic calibration means for compensating for detected errors. It is another object of this invention to produce such an automatic calibration means for periodically compensating for detected errors. It is also an object of this invention to avoid the necessity of precisely adjusting the initial values of various components associated with the transducer circuits.

SUMMARY OF THE INVENTION

These and other objects of this invention are achieved by the preferred embodiment disclosed herein which is an apparatus for calibrating a sensor used for producing an analog electrical output signal representative of a predetermined sensed parameter comprising:

reference signal means for producing a first and second reference signal;

an signal conditioning circuit operatively connected to condition said output signal;

multiplexer means interposed between said sensor and said signal amplifier for selectively passing said output signal or said reference signals to said signal conditioning circuit;

an analog to digital convertor operatively connected to the output of said sensor and said signal conditioning circuit; and control means operatively connected to said converter output said multiplexer and said reference signal means for periodically determining predetermined characteristics of said sensor and said signal conditioning circuit such as actual gain and output offset and for utilizing same to determine a corrected sensor output signal.

DESCRIPTION OF THE PREFERRED EMBODIMENT

Figure 1:
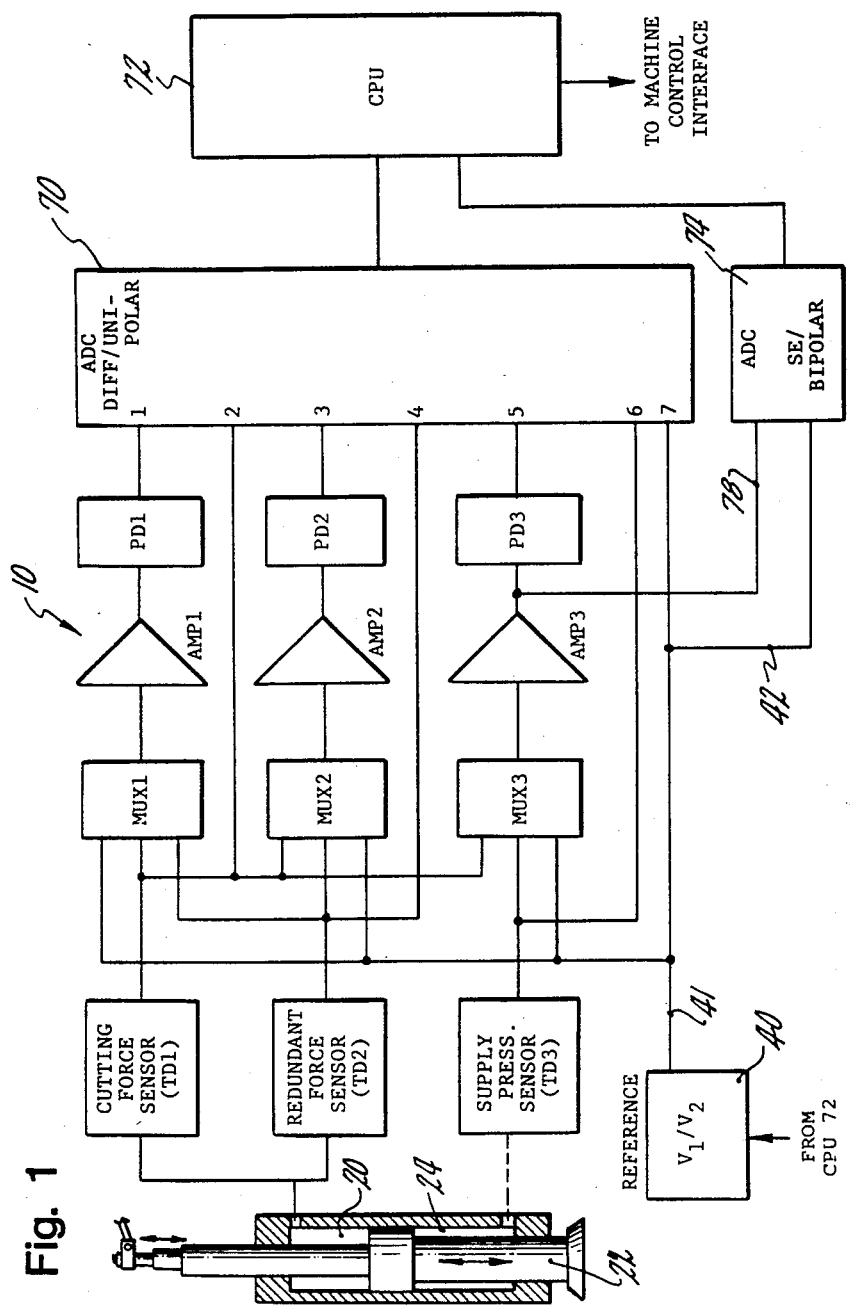
FIG. 1 shows a schematic block diagram of a control system constructed in accordance with the preferred embodiment of the invention.

Referring now to FIG. 1 there is shown a schematic block diagram of a control system constructed in accordance with the principles of the invention for calibrating the pressure transducers of a hydromechanical gear shaping machine such as that shown in the aforementioned U.S. Pat. No. 4,136,302. Indeed, the supply and load pressure transducers shown in this patent are utilized in the present invention.

The automatic calibration system 10 is designed to work with and calibrate load pressure transducer TD1, redundant load transducer TD2 and supply pressure transducer TD3. Load transducer TD1 constitutes the primary load sensing device for the control of the hydromechanical gear shaping machine. Redundant load pressure sensor TD2 serves as a back up. Both load pressure sensors detect the hydraulic load pressure on the load side 20 of the piston of cutter spindle 22. One benefit of this redundancy is the characteristics of each of the various sensors and circuits are determined so that in the event of a transducer or circuit failure the good transducer circuit may be combined without any adverse consequences on the machine operation since the remaining good elements are already calibrated. Supply pressure transducer TD3 senses the hydraulic supply pressure to the supply side 24 of cutter spindle 22. It will be understood that these transducers produce signals ultimately used by a central processing unit to control the operation of the gear shaper.

Each pressure transducer TD1, TD2 and TD3 provides to its respective multiplexer MUX1, MUX2 and MUX 3 an analog electrical output signal corresponding to the sensed pressure. Each multiplexer also receives a reference voltage input from reference source 40 as well as from the primary hydraulic load pressure sensor TD1. All of the multiplexers are provided with identical inputs and may be interchanged by the control system if desired in order to compare the operation of one set of circuit elements to another.

The output of each multiplexer MUX1, MUX2 and MUX3 is provided to a respective amplifier AMP1, AMP2 and AMP3 each of which in turn is operatively connected to peak detector circuits PD1, PD2 and PD3 respectively. Each peak detector acquires and holds the maximum output of its associated amplifier which occurs during a predetermined sample time period (e.g. one cutting cycle). The output of the peak detectors as well as the outputs of each of the pressure transducers are provided to various ports of analog to digital converter 70 (differential input, unipolar) which is in turn operatively connected to central processing unit 72. It will be noted that system 10 as shown incorporates three channels for passing tranducer signals to the CPU. For simplifying the description of the flowcharts below the various components are identified by their channel number. The peak detectors are shown in FIG. 1 because they are used by the control system of the hydromechanical gear shaper to control machine operation. The detectors are not necessary for proper operation of the invention. It will be understood, however, that the three channels for passing transducer signals to the CPU may include any type of signal conditioning circuit.

Reference voltage source 40 provides, at predetermined times under the control of CPU 72, one of two reference voltages $V_1$ or $V_2$ on line 41. A second analog to digital converter 74 (single ended input, bi-polar) is provided for receiving the reference voltages along line 42 and the output of amplifier AMP3 along line 78. Two different converters are used to get better resolution since the inputs to converter 70 will only be positive and those to converter 74 may be negative. The output of converter 74 is also provided to CPU 72. The output of the CPU is provided to the machine control interface (not shown) for controlling the operation of the hydromechanical gear shaping machine.

The operation of calibration system 10 may be effected either in hardware or software. The preferred embodiment of calibration system 10 utilizes a computer program which follows the program steps outlined in the flowcharts of FIG. 2-7 in order to calibrate the hydraulic pressure sensor outputs. Consequently, the operation of the invention will be described with reference to these flowcharts.

Several of the program steps included in FIGS. 2-5 are included in the start up diagnostics of a computer numerically controlled (CNC) gear shaper and executed every time the machine is started. Other program steps may be executed cyclically at predetermined intervals during machine operation. For example, large gears require a long production time during which there is a greater tendency for pressure changes or circuit errors to occur. For such gears it may be desireable to calibrate the sensors periodically during production.

The sequence starts with first applying power to the various control systems with no power on the machine or any part of the hydraulic pumps. Accordingly, the hydraulic pressure is initially zero. This initial pressure is used to determine the transducer offset through the use of a two part subroutine: first, determining the output offset and gain error of amplifier AMP3 and second, determining the actual gain and offset of each amplifier and the associated peak detector circuits.

Figure 2:
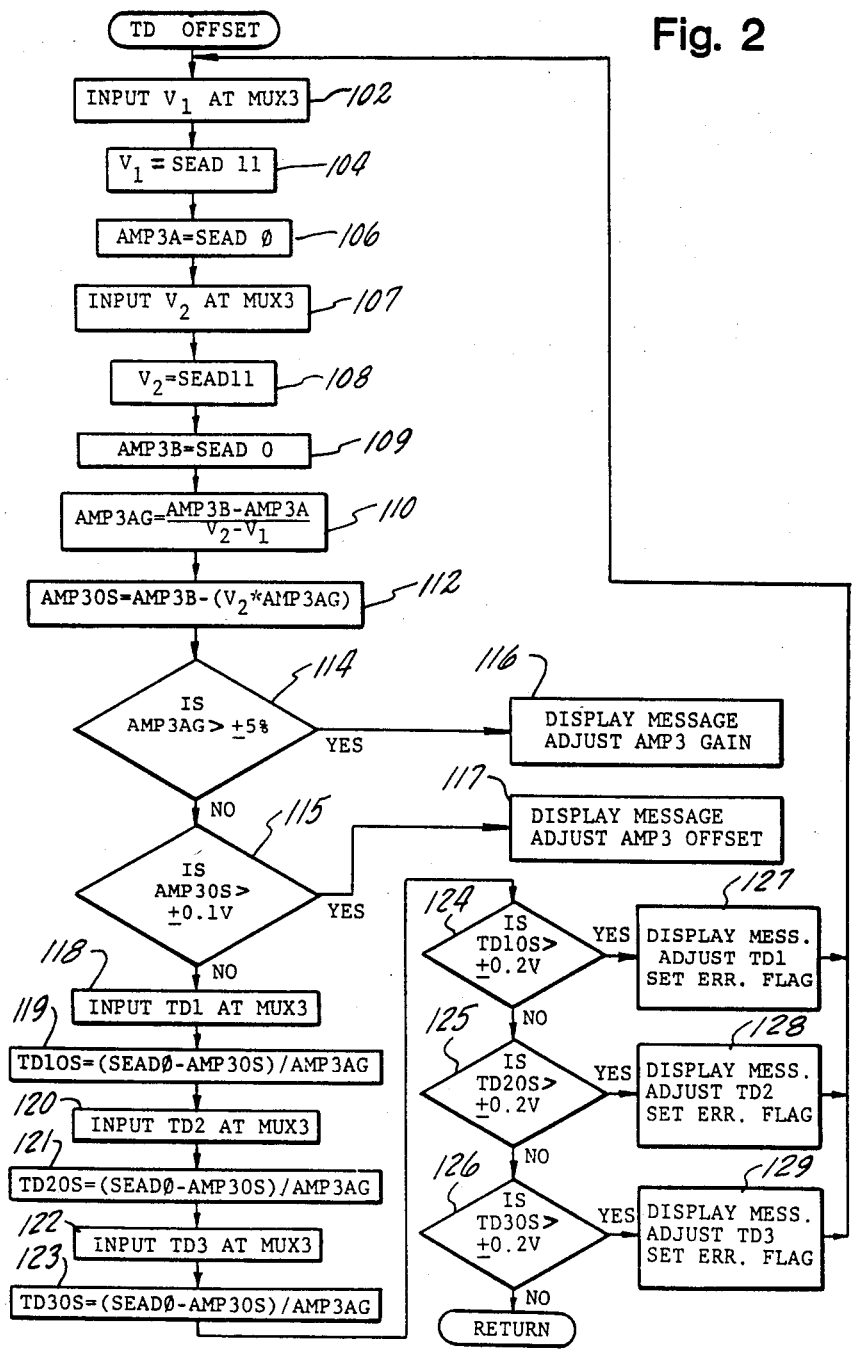
FIGS. 2–5 show various flow charts describing the operation of the preferred embodiment.

The determination of output offset and gain error of amplifier AMP3 proceeds by first applying a known input reference voltage $V_1$ to multiplexer MUX3 as shown in step 102 of FIG. 2. This reference voltage $V_1$ is also provided via line 41 and converter 74 to CPU 72 and is stored at one memory address as shown in step 104. The resulting output of amplifier AMP3 is then read from line 78 and stored in memory as shown in 106. Then a similar set of steps 107, 108 and 109 are used with a second intput reference voltage $V_2$ to determine the amplifier response at this second reference. The resulting values stored in memory at steps 104, 106, 108 and 109 are used in step 110 to calculate the actual gain which is equal to the amplifier output at $V_2$ minus its output at $V_1/(V_2-V_1)$. The amplifier offset is then determined in step 112 as being the amplifier output at $V_2$ minus $V_2$ times the actual gain. These calculated values will be used in other portions of the program as will be explained below.

The calibration system 10 is a portion of a computer control system for the hydromechanical gear shaper and therefor operates with an input-output device such as a cathode ray tube. The control program as described in FIG. 2-5 incorporates several steps which may prompt display messages on the CRT for the machine operator. For example, steps 114 and 115 of FIG. 2 determine whether the gain or offset of amplifier AMP3 is within certain predetermined limits. If so, the program branches to steps 116 and 117 in order to display appropriate messages to the operator instructing him to adjust gain or offset potentiometers accordingly. If the conditions are not met, the program continues at step 118 to determine transducer offset values using the now known circuit characteristics of amplifier AMP3.

After the gain and offset characteristics of amplifier AMP3 have been determined CPU 72 causes the reference voltages $V_1$ and $V_2$ from reference source 40 to be replaced by the outputs of transducers TD1, TD2 and TD3 which are then sequentially switched through multiplexer MUX3 and amplifier AMP3. The corresponding outputs of amplifier AMP3 are read and stored by CPU 72 and, as shown in steps 118-123, the offset values of the various transducers TD1, TD2 and TD3 are determined according to the formula: transducer offset=(sensor zero signal−amplifier output offset)/amplifier gain. As shown in steps 124, 125 and 126 each of these transducer offset values is compared with predetermined permissible limits and appropriate display messages are provided to the operator at steps 127, 128 and 129 to make appropriate zero adjustments if necessary.

If the predetermined offset limits are exceeded, the program steps 127, 128 and 129 also set corresponding error flags to stop the cycle. It will be noted that system 10 will effect automatic corrections of the transducer outputs only within predetermined limits. If these limits are exceeded it is assumed for safety reasons that something other than normal drift or minor circuit error has occurred and the machine will be stopped until a manual, operator correction is made.

Figure 3:
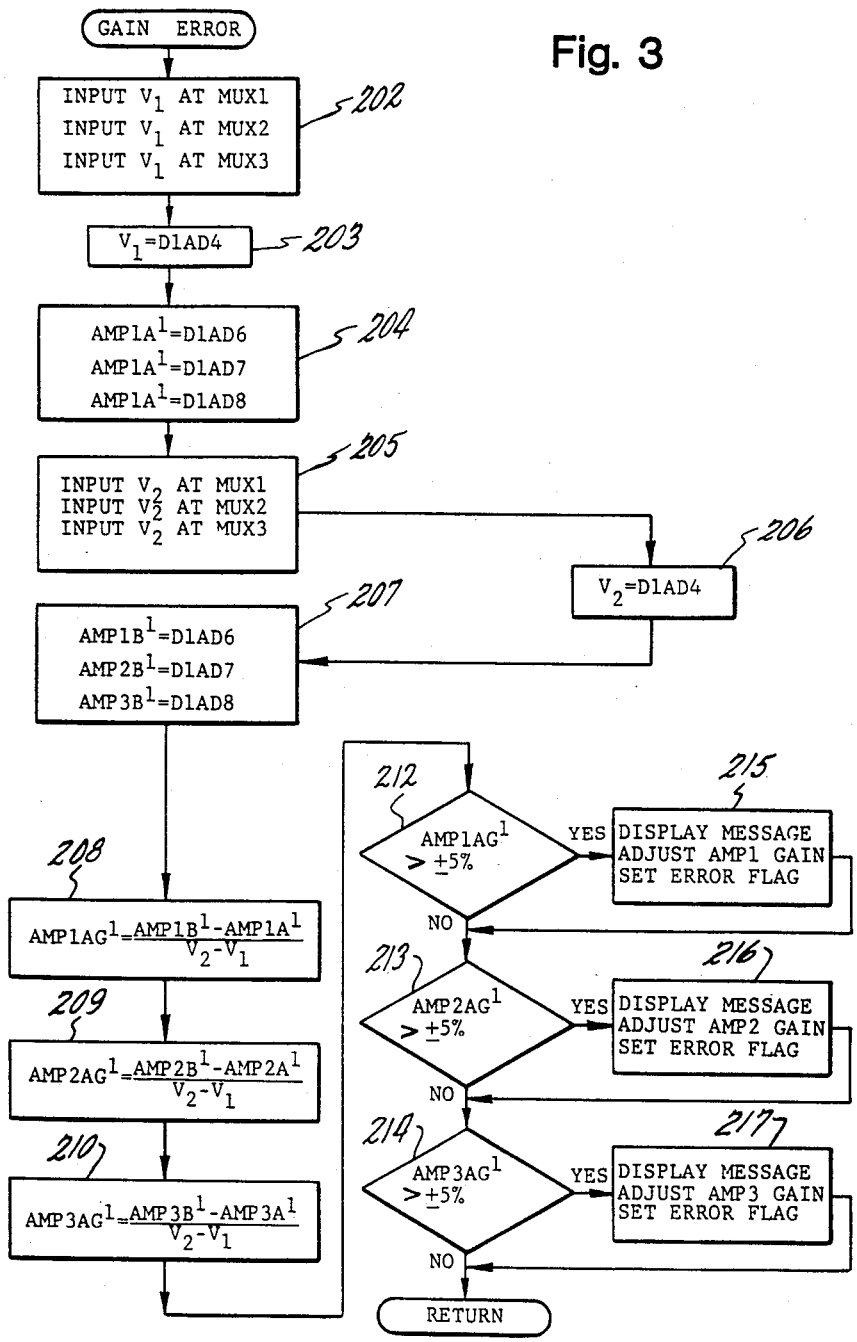

The program also uses the subroutine shown in FIG. 3 in order to determine the actual gain of each amplifier and its corresponding peak detector circuit. This is done as shown at program steps 202-210 in a manner similar to the program steps 102-110 described above with respect to FIG. 2. The difference between FIGS. 2 and 3 at this point is that the amplifier outputs referred to in FIG. 3 are determined as the digital outputs of each channel through the respective peak detector circuits PD1, PD2 annd PD3 via the analog to digital converter 70. Indeed, it will be noted that the memory addresses of the data determined in FIG. 3 are different from FIG. 2 and the data shown in FIG. 3 is primed. Each of the amplified values is then compared against predetermined permissible limits at steps 212-214 and appropriate messages are displayed and error flags are set, if necessary, at steps 215, 216 and 217.

Figure 4:
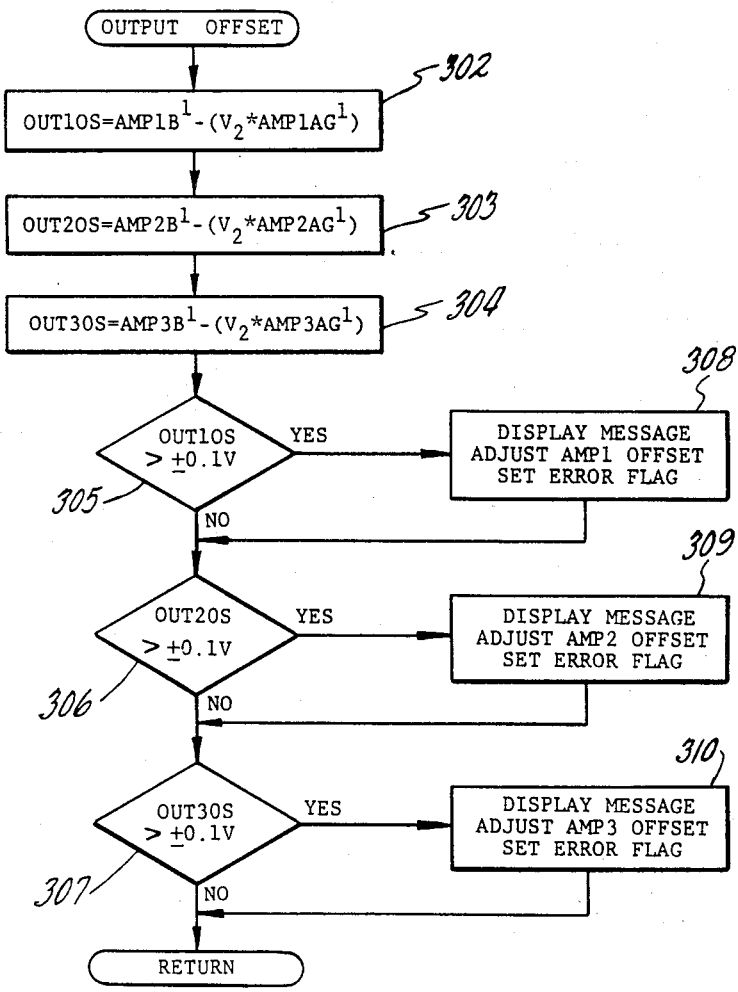

Next, the output offset for each amplifier AMP1, AMP2 and AMP3 and its corresponding peak detector circuits is determined by the program steps shown in FIG. 4. The steps 302-304 determine the output offset for the detecting circuits associated with transducers TD1, TD2 and TD3 respectively. The offset value is determined similarly to step 112 in FIG. 2. The difference between step 112 and 304, for example, is that the amplifier output used at step 304 is the output of the entire circuit through the peak detector PD3 and not just the amplifier output alone (as in step 112). Each of the output offsets is then compared at steps 305, 306 and 307 to predetermined permissible limits and appropriate display messages are given and error flags are set at steps 308, 309 and 310, if necessary.

Having thus determined the actual gains and offsets in the outputs of the transducers and the amplifier circuits, appropriate correction factors may be derived in order to correct each signal by an amount equal to the errors introduced by the circuits in order to arrive at true and correct values of the prevailing hydraulic pressures. This correction is ideally done periodically during the operation of the machine, for example, once every cutting cycle.

Figure 5:
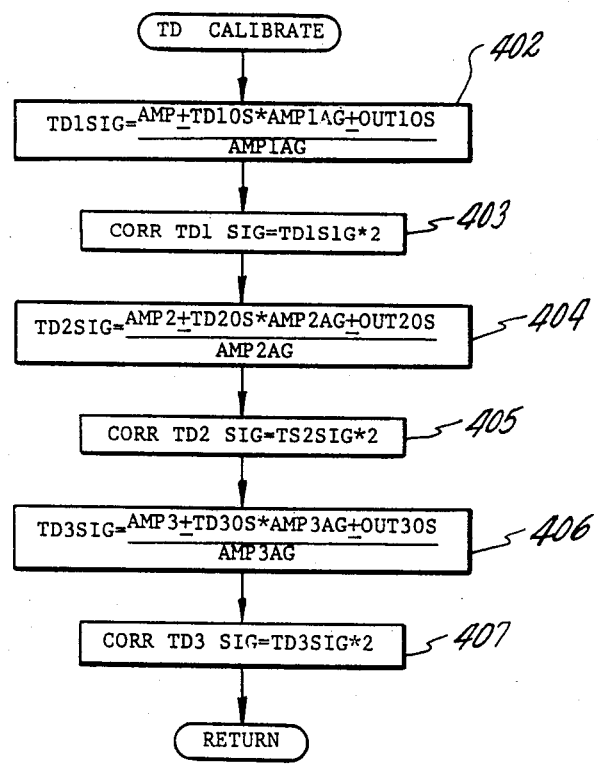

The corrected sensor signal is calculated by CPU 72 according to the following formula: corrected sensor signal=[sensor signal±(sensor offset×actual gain)-±output offset]×[required gain/actual gain]. The required gain is the theoretical gain due to the particular circuit components utilized. In the preferred embodiment this gain equals two. The calculation of this corrected sensor signal for each of the three transducers is shown in FIG. 5 at steps 402–407. The corrected signals are the ones output to the machine interface to control various functions described in the aforementioned patents.

It will be noted that not only does calibration system 10 provide for error determinations and automatic calibration to maintain accurate and true sensor signals for efficient and reliable machine operations but it also eliminates the requirements for the initial precise adjustment of all aforementioned circuit elements.

It will be understood that the automatic calibration system 10 may be applied to any computer controlled manufacturing equipement where accurate sensor signals are necessary in real time for control purposes.

It will be further understood by those skilled in the art that numerous modifications and improvements may be made of the preferred embodiment of the invention disclosed herein without departing from the spirit and scope thereof.

What is claimed is:

1. An apparatus for calibrating a sensor output by producing a corrected sensor output, said sensor for producing an analog electrical output signal representative of a predetermined sensed parameter, comprising:
   a signal conditioning circuit operatively connected to condition said output signal;
   a reference signal means for producing first and second reference signals;
   multiplexer means connected to said reference signal means and interposed between said sensor and said signal conditioning circuit for selectively passing said output signal or either of said first and second reference signals to said signal conditioning circuit;
   an analog to digital converter operatively connected to the output of said sensor and said signal conditioning circuit; and
   digital control means operatively connected to said converter output, said multiplexer and said reference signal means for periodically determining predetermined characteristics of said sensor and said signal conditioning circuit and for utilizing said predetermined sensor output signal, wherein said predetermined characteristics comprise the actual gain and output offset of said signal conditioning circuit utilizing said first and second reference signals as inputs thereto, and the output offset of said sensors.

2. An apparatus for calibrating a sensor output by producing a corrected sensor output, said sensor for producing an analog electrical output signal representative of a predetermined sensed parameter, comprising:
   a signal conditioning circuit operatively connected to condition said output signal;
   means for producing a reference signal;
   multiplexer means connected to said reference signal means and interposed betwen said sensor and said signal conditioning circuit for selectively passing said output signal or said reference signal to said signal conditioning circuit;
   an analog to digital converter operatively connected to the output of said sensor and said signal conditioning circuit; and
   digital control means operatively connected to said converter output, said multiplexer and said reference signal means for periodically determining predetermined characteristics of said sensor and said signal conditioning circuit and for utilizing said predetermined sensor output signal, wherein said predetermined characteristics comprise the actual gain and output offset of said signal conditioning circuit utilizing said reference signal as input thereto, and the output offset of said sensors.

3. Apparatus as defined in claim 2, comprising first and second reference signals which are selectively passed by said multiplexer means and utilized by said digital control means.

4. An apparatus according to claim 1 wherein said corrected signal is determined by the formula $S_c=[S_o\pm(S_f G)\pm O_f](T.G./G)$ where
   $S_c$=corrected sensor output
   $S_o$=actual sensor output
   $S_f$=sensor offset determined with zero input
   $G$=actual gain of the signal conditioning circuit
   $O_f$=output offset of the signal conditioning circuit
   $T.G.$=theoretical gain of the signal conditioning circuit.

5. An apparatus according to claim 1 wherein said sensor is operatively connected to produce a signal representative of hydraulic pressure utilized in a gear production machine and said corrected sensor output is utilized to control predetermined operations of said machine.

6. An apparatus according to claim 1 further comprising:
   a second sensor connected to said converter for sensing a predetermined sensed parameter;
   a second signal conditioning circuit operatively connected to said converter and to condition the output of said second sensor;
   a second multiplexer means connected to said reference signal means interposed between said second sensor and said second signal conditioning circuit for selectively passing and output signal or either of said first and second reference signals to said second signal conditioning circuit;
   said digital control means operatively connected to said second sensor and said second multiplexer for periodically determining and predetermined characteristics of said second sensor and said signal conditioning circuit, and second control means of operatively connected to said converter output, said second multiplexer and said reference signal means for periodically checking each of said sensors and their associated elements to determine their satisfactory operation and for replacing those of said sensors or associated elements determined to be unsatisfactory with those which are satisfactory thereby enabling continuous and uninterrupted calibrated operations of said machine in the event of the failure of any of said sensors or associated elements.

7. An apparatus for calibrating a sensor output by producing a corrected sensor output, said sensor for producing an analog electrical output signal representative of a predetermined sensed parameter, comprising:

a signal conditioning circuit operatively connected to condition said output signal;

a reference signal means for producing first and second reference signals;

multiplexer means connected to said reference signal means and interposed betwen said sensor and said signal conditioning circuit for selectively passing said output signal or either of said first and second reference signals to said signal conditioning circuit;

an analog to digital converter operatively connected to the output of said sensor and said signal conditioning circuit;

digital control means operatively connected to said converter output, said multiplexer and said reference signal means for periodically determining predetermined electrical characteristics of said sensor and said signal conditioning circuit and for utilizing said predetermined electrical characteristics to produce corrected sensor output signal, wherein said predetermined characteristics comprise the actual gain and output offset of said signal conditioning circuit utilizing said first and second reference signals as inputs thereto, and the output offset of said sensors, and wherein said corrected signal is determined by the formula $S_c = [S_o \pm (S_f \cdot G) \pm O_f](T.G./G)$ where $S_c$ = corrected sensor output $S_o$ = actual sensor output with zero input $S_f$ = sensor offset determined with zero input $G$ = actual gain of the signal conditioning circuit $O_f$ = output offset of the signal conditioning circuit $T.G.$ = theoretical gain of the signal conditioning circuit.

8. An apparatus according to claim 7 wherein said sensor is operatively connected to produce a signal representative of hydraulic pressure utilized in a gear production machine and said corrected sensor output is utilized to control predetermined operations of said machine.

9. An apparatus according to claim 7 further comprising:

a second sensor connected to said converter for sensing a predetermined sensed parameter;

a second signal conditioning circuit operatively connected to said converter to condition the output of said second sensor;

a second multiplexer means connected to said reference signal means interposed between said second sensor and said second signal conditioning circuit for selectively passing said output signal or either of said first and second reference signals to said second signal conditioning circuit, said digital control means being operatively connected to said second sensor and said second multiplexer for periodically determining predetermined characteristics of said second sensor and said signal conditioning circuit, and second control means operatively connected to said converter output, said second multiplexer and said reference signal means for periodically checking each of said sensors and their associated elements to determine their satisfactory operation and for replacing those of said sensors or associated elements determined to be unsatisfactory with those which are satisfactory thereby enabling continuous and uninterrupted calibrated operations of said machine in the event of the failure of any said sensors or associated elements.

* * * * *